Patented Feb. 25, 1941

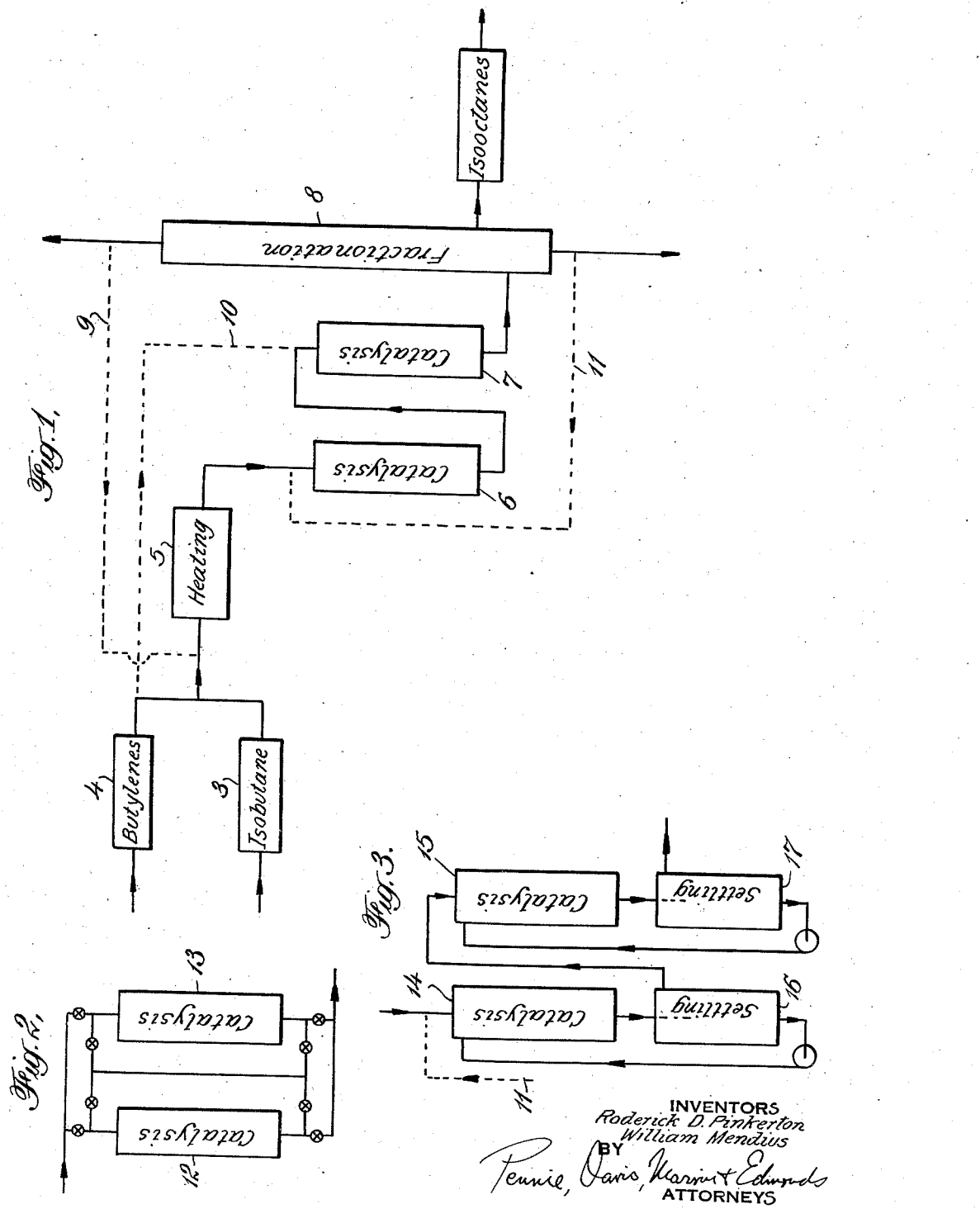

2,233,144

UNITED STATES PATENT OFFICE 2,233,144

MANUFACTURE OF GASOLINE

Roderick D. Pinkerton, Chicago, Ill., and William Mendius, Munster, Ind., assignors to Sinclair Refining Company, New York, N. Y., a corporation of Maine Application October 19, 1939, Serial No. 300,164

5 Claims. (Cl. 196—10)

This invention relates to improvements in the manufacture of iso-octanes. More particularly, this invention provides a process for the production of iso-octanes by direct condensation of butylenes and isobutane. It has hitherto been proposed to produce iso-octanes by dehydrogenating isobutane, polymerizing the butylenes thus formed to produce iso-octylenes and hydrogenating these iso-octylenes to produce iso-octanes. The process of this invention makes it possible to eliminate such dehydrogenation and hydrogenation.

We have discovered that, using a phosphoric acid catalyst, isobutane can be catalytically condensed with any or all of the butylenes to produce directly iso-octanes. The reaction involved is an alkylation reaction, that is a condensation of a saturate with an unsaturate, as distinguished from a polymerization reaction, a condensation of an unsaturate with an unsaturate.

Since the hydrocarbon mixture subjected to condensation in the process of the invention necessarily includes unsaturates as well as saturates, or more specifically butylenes as well as isobutane, it is important to control the conditions of condensation to minimize polymerization reactions if a maximum conversion of the isobutane and butylenes to iso-octanes is to be had. To attain this result, we maintain a relatively low temperature and a relatively high pressure in the region of catalyst contact. In general the temperature should not exceed about 450° F. As the temperature is increased from about 200° F. to about 450° F., the conversion of isobutane increases and the conversion of butylenes also increases. As the temperature is increased above about 450° F., secondary reactions apparently involving decomposition of originally formed condensation products increase and, although the apparent conversion of isobutane and the saturation of the liquid products of the condensation may continue to increase, the yield and the quality of the liquid product decrease rapidly. The conversion of butylenes also decreases as the temperature is increased above about 450° F. Temperatures approximating 300°-400° F. are particularly advantageous. Temperatures lower than 150°-200° F. are operable but require excessive periods of catalyst contact. In general, pressures upwards of about 500 pounds per square inch, ranging up to perhaps 1000-1200 pounds per square inch, are useful. At temperatures up to about 300° F., pressures of this order are sufficient to maintain liquid phase conditions in the region of catalyst contact. By maintaining liquid phase conditions in the region of catalyst contact, homogeneous catalysis is effected. The relatively high pressure used promotes alkylation and suppresses polymerization. The relatively low temperature used has this same effect. While the time period of catalyst contact is not critical, useful results are to be attained only if the period of catalyst contact is sufficient to effect substantial alkylation. Time periods of catalyst contact corresponding to rates of flow through the catalyst upwards of about 0.02-0.06 gallon per pound of catalyst per hour are, for example, useful.

The hydrocarbon mixture subjected to catalyst contact, in carrying out the process of this invention, may consist exclusively of isobutane and one or more of the butylenes. However, in practical operation, these hydrocarbons are not individually available except at exorbitant cost. For example, isobutane is a substantial component of fractions conveniently recovered in connection with the recovery of natural gasoline from casinghead gas mixtures and the butylenes are a substantial component of fractions conveniently recovered in connection with the stabilization of cracked gasoline. Such fractions, containing isobutane and the butylenes in substantial concentrations are useful in carrying out the process of the invention. Such fractions can be described as consisting essentially of isobutane and a butylene component, one or more of the butylenes. To the extent that other hydrocarbons are present, side reactions consuming either isobutane or the butylenes in the formation of products other than iso-octanes may occur. It is thus important, for best results, that the saturates present be predominantly isobutane and the unsaturates present be predominantly butylenes. It is also important, particularly with respect to maximum recovery of iso-octanes, that a substantial excess of isobutane, with respect to butylenes, be present in the region of catalyst contact. Thus, the hydrocarbon mixture subjected to catalyst contact should comprise a major proportion of isobutane and a minor proportion of a butylene component. The concentration of the butylene component, within the region of catalyst contact, is with advantage maintained by progressive addition of the butylene component during the period of catalyst contact. This may be accomplished, for example, by the addition of the butylene component, in relatively high concentration, at one or more intermediate points in the path of travel of the hydrocarbon mixture through the catalyst. With a major proportion of isobutane in the hydrocarbon mixture subjected to catalyst contact, the products of the condensation normally include a substantial proportion of unreacted isobutane. Such unreacted isobutane is with advantage separated from the products of the condensation, for example in connection with the fractionation including any stabilization of the iso-octane fraction produced, and recirculated through the region of catalyst contact.

We use the known phosphoric acid condensation catalysts in carrying out the process of the invention. The phosphoric acid catalysts may be used as a liquid or distributed upon an appropriate carrier. An appropriate catalyst of the latter type may be prepared, for example, by mixing orthophosphoric acid or pyrophosphoric acid with siliceous material such as kieselguhr or aluminum silicate and calcining the mixture at a temperature of 350°–750° F. The calcined catalysts may comprise three parts by weight of the phosphoric acid compound and one part by weight of the carrier. The calcined mixture may be ground and sized or pelleted or some carbonaceous material may be incorporated into the mixture prior to calcination to render the calcination product porous. A tendency toward entrainment of phosphoric acid esters in the liquid condensation products is sometimes encountered, particularly with lower temperatures in the region of catalyst contact. When using a liquid phosphoric acid catalyst, it is advantageous to separate a residual fraction from the products of the catalytic condensation and to return at least part of this residual fraction to the region of catalyst contact to avoid or minimize any loss of catalyst through such entrainment. When using a solid phosphoric acid catalyst, it is advantageous to effect the catalyst contact in two stages, maintaining a lower temperature approximating 150°–300° F. in the first stage and a higher temperature approximating 250°–450° F. in the second stage, and periodically to exchange the catalyst between the first and second stage. In such operation, the major part of the alkylation is effected in the first or low temperature stage and the second stage serves to complete the alkylation while also effecting a recovery of any phosphoric acid compounds entrained in the liquid condensation products from the first stage. Thus, by periodical exchange of the catalyst between the two stages, catalyst quantity and catalyst activity are maintained. By limiting the temperature to about 300° F., liquid phase conditions can be maintained in the first, or in both stages.

Operations embodying the invention are illustrated in the following specific examples: The charging stock used in each of the examples contained about 8.2 volumes of isobutane per volume of olefins, principally butylenes and analyzed as follows, the percentages being by weight:

|  | Per cent |
|---|---|
| $C_2$— | 0.0 |
| $C_3H_6$ | 0.2 |
| $C_3H_8$ | 3.0 |
| $C_4H_8$ | 8.0 |
| $C_4H_{10}$ | 83.5 |
| $C_5$— | 5.3 |
| $C_6$+ | 0.0 |

This charging stock was passed through the catalyst at a rate approximating 0.05 gallon per pound of catalyst per hour under a pressure of 1000 pounds per square inch at a temperature of 200° F. in the first example, 300° F. in the second example and 450° F. in the third example. The products of the three examples analyzed as follows, the percentages being by weight:

|  | First | Second | Third |
|---|---|---|---|
| $C_2$— | 0.1 | 0.1 | 0.2 |
| $C_3H_6$ | 0.0 | 0.1 | 0.0 |
| $C_3H_8$ | 3.0 | 3.5 | 3.3 |
| $C_4H_8$ | 4.3 | 1.9 | 0.2 |
| $C_4H_{10}$ | 82.1 | 81.5 | 78.7 |
| $C_5$— | 3.8 | 3.3 | 6.6 |
| $C_6$+ | 6.7 | 9.6 | 11.0 |

The yields of $C_6$+ hydrocarbons based on the $C_4$— olefin content of the charge were, by weight, 63%, 93% and 134%, respectively, and based on the reacted $C_4$— olefins were, by weight, 133%, 123% and 137%. The distillation analyses of the products of the three examples were as follows, the analysis for the first being of the $C_5$+ product and the analyses of the second and third being of the $C_6$+ product:

|  | First | Second | Third |
|---|---|---|---|
| Gravity A. P. I. at 60° F | 62.7 | 58.9 | 55.9 |
| Initial | 108 | 151 | 141 |
| 10% | 153 | 205 | 192 |
| 20% | 186 | 225 | 212 |
| 30% | 215 | 236 | 229 |
| 40% | 231 | 242 | 245 |
| 50% | 240 | 248 | 262 |
| 60% | 248 | 255 | 285 |
| 70% | 258 | 265 | 323 |
| 80% | 278 | 286 | 378 |
| 90% | 367 | 370 | 456 |
| E. P | 468 | 488 | 548 |
| Percent recovery | 96.0 | 97.5 | 97.0 |
| Percent residue | 2.8 | 2.4 | 3.0 |
| Percent loss | 1.2 | 0.1 | 0.0 |

The average molecular weights of these three products were 107, 117 and 118, respectively. The bromine addition number of the three products was, respectively, 71.4, 65.0 and 43.1, and the bromine substitution number was, respectively, 30.2, 35.8 and 34.1.

Operations embodying the invention are further illustrated, as in a flow diagram, in the accompanying drawing in which Figure 1 illustrates one combination of the catalysis with a subsequent fractionation, with several modifications, and Figure 2 and Figure 3 illustrate modifications of the catalysis.

In the operation illustrated in Figure 1, a hydrocarbon mixture consisting essentially of isobutane, supplied at 3, and one or more of the butylenes, supplied at 4, is heated, at 5, to the reaction temperature and then is passed in contact with a phosphoric acid catalyst, in two stages, as indicated at 6 and 7, and the products of the condensation are fractionated at 8, to recover the iso-octanes produced. The conditions of temperature—pressure—time and the composition of the hydrocarbon mixture previously described are maintained in the catalysis. Unreacted isobutane may also be separated in the fractionation and recirculated through the catalysis as indicated at 9. Any unreacted butylenes may similarly be separated and recirculated through the catalysis as indicated at 9. The butylene component may be added to the isobutane fraction supplied to the catalysis before the first catalyst contact, or, as indicated at 10, part of the butylene component may be added to the isobutane fraction prior to the first catalyst contact and another part may be added at an intermediate point during the catalyst contact. When it is desired to separate a residual fraction from the products of the catalytic condensation and return at least a part of this residual fraction to the region of catalyst contact to minimize loss of catalyst through entrainment, as previously described, such recirculation may be effected as indicated at 11.

When using a solid catalyst, the catalysis is with advantage effected in two stages appropriately connected, as illustrated in Figure 2, to permit periodic reversal of the flow through the catalyst charges. Thus, for example, in the operation illustrated in Figure 2, flow for a period may be through stage 12 and then through stage 13, a low temperature being maintained in stage 12 and a higher temperature being maintained in stage 13 during this period, then for a following period flow may be through stage 13 and then through stage 12, a low temperature being maintained in stage 13 and a higher temperature being maintained in stage 12 during this period, and so on.

The modification of the catalysis illustrated in Figure 3 is advantageous for use when the phosphoric acid catalyst is used as a liquid. The catalyst contact zones 14 and 15 perform the function of the catalyst contact zones 6 and 7 in Figure 1. When using a liquid phosphoric acid catalyst the hydrocarbon mixture in liquid phase and the liquid catalyst advantageously may be passed together at the proper temperature and pressure through a mixing zone 14 and then into a settling vessel 16 wherein the hydrocarbons separate as a top liquid layer. This top liquid layer then passes to the mixing zone 15 of the second stage of the catalyst contact. Phosphoric acid from the lower layer is advantageously recirculated to the catalysis 14. The second stage mixing zone 15 and its associated settling zone 17 may function in the same manner as the primary mixing zone 14 and its associated settling zone 16.

We claim:

1. In the manufacture of iso-octane, the improvement which comprises subjecting a hydrocarbon mixture consisting essentially of a major proportion of isobutane and a minor proportion of a butylene component to contact with a phosphoric acid catalyst at a temperature approximating 150°–450° F. under a pressure upwards of about 500 pounds per square inch for a period of time sufficient to effect substantial alkylation.

2. In the manufacture of iso-octane, the improvement which comprises subjecting a hydrocarbon mixture consisting essentially of a major proportion of isobutane and a minor proportion of a butylene component to contact with a phosphoric acid catalyst at a temperature approximating 150°–450° F. under a pressure upwards of about 500 pounds per square inch for a period of time sufficient to effect substantial alkylation, and maintaining the concentration of the butylene component in the region of catalyst contact by progressive addition of the butylene component during the period of catalyst contact.

3. In the manufacture of iso-octane, the improvement which comprises subjecting a hydrocarbon mixture consisting essentially of a major proportion of isobutane and a minor proportion of a butylene component to contact with a phosphoric acid catalyst at a temperature approximating 150°–450° F. under a pressure upwards of about 500 pounds per square inch for a period of time sufficient to effect substantial alkylation, separating an isobutane fraction from the products of the catalytic condensation and recirculating this isobutane fraction through the region of catalyst contact.

4. In the manufacture of iso-octane, the improvement which comprises subjecting a hydrocarbon mixture consisting essentially of isobutane and a butylene component to contact with a liquid phosphoric acid catalyst at a temperature approximating 150°–450° F. under a pressure upwards of about 500 pounds per square inch for a period of time sufficient to effect substantial alkylation, separating a residual fraction from the products of the catalytic condensation and returning at least part of this residual fraction to the region of catalyst contact.

5. In the manufacture of iso-octane, the improvement which comprises subjecting a hydrocarbon mixture consisting essentially of isobutane and a butylene component to contact with a solid phosphoric acid catalyst in two stages, in the first at a temperature approximating 150°–300° F. under a pressure upwards of about 500 pounds per square inch and in the second at a higher temperature not exceeding about 450° F. under a pressure upwards of about 500 pounds per square inch for a period of time sufficient to effect substantial alkylation and periodically exchanging the catalyst between the first and second stages.

RODERICK D. PINKERTON.
WILLIAM MENDIUS.

DISCLAIMER 2,233,144.—*Roderick D. Pinkerton*, Chicago, Ill., and *William Mendius*, Munster, Ind. MANUFACTURE OF GASOLINE. Patent dated February 25, 1941. Disclaimer filed October 31, 1944, by the assignee, *Sinclair Refining Company*.

Hereby enters this disclaimer to claim 3 of said patent.

[*Official Gazette November 28, 1944.*]